United States Patent [19]

Rafferty et al.

[11] Patent Number: 5,523,169
[45] Date of Patent: Jun. 4, 1996

[54] METAL REPAIR TAPE FOR SUPERALLOYS

[76] Inventors: Kevin Rafferty, 193 Countryview Dr., Harrison, Ohio 45030; Bruce Rowe, 3043 Wold Ave., Cincinnati, Ohio 45206

[21] Appl. No.: 305,412

[22] Filed: Sep. 13, 1994

Related U.S. Application Data

[63] Continuation of Ser. No. 18,866, Feb. 17, 1993, abandoned, which is a continuation-in-part of Ser. No. 970,692, Nov. 4, 1992, abandoned.

[51] Int. Cl.$^6$ ........................................................ B22F 7/02
[52] U.S. Cl. ................ 428/551; 428/547; 428/556; 428/557; 428/560; 428/564; 428/565; 29/402.09; 29/402.16
[58] Field of Search ................... 428/551, 556, 428/557, 559, 560, 564, 565, 539.5, 547, 549; 29/402.02, 402.09, 402.16, 402.19, 402.21; 164/92.1

[56] References Cited

U.S. PATENT DOCUMENTS

| | | | |
|---|---|---|---|
| 2,808,352 | 10/1957 | Coleman et al. | 117/227 |
| 3,293,072 | 12/1966 | Doolittle et al. | 117/138.8 |
| 3,719,538 | 3/1973 | Carlson et al. | 156/179 |
| 3,743,556 | 7/1973 | Breton et al. | 156/62.8 |
| 3,759,692 | 9/1973 | Zelahy | 75/0.5 |
| 3,778,586 | 12/1973 | Breton et al. | 219/76 |
| 3,841,942 | 10/1974 | Carlson et al. | 156/436 |
| 3,864,124 | 2/1975 | Breton et al. | 75/212 |
| 3,876,447 | 4/1975 | Lally | 117/22 |
| 3,917,149 | 11/1975 | Breton et al. | 228/124 |
| 3,997,447 | 12/1976 | Breton et al. | 210/360 A |
| 4,016,345 | 4/1977 | Holmes | 526/206 |
| 4,042,747 | 8/1977 | Breton et al. | 428/323 |
| 4,098,450 | 7/1978 | Keller et al. | 228/119 |
| 4,112,180 | 9/1978 | Steigelman | 428/332 |
| 4,194,040 | 3/1980 | Breton et al. | 428/308 |
| 4,228,214 | 10/1980 | Steigelman et al. | 428/212 |
| 4,325,754 | 4/1982 | Mizuhara et al. | 148/22 |
| 4,381,944 | 5/1983 | Smith, Jr. et al. | 75/255 |
| 4,477,527 | 10/1984 | Grosner | 428/401 |
| 4,478,638 | 10/1984 | Smith, Jr. et al. | 75/255 |
| 4,528,230 | 7/1985 | Larson | 428/137 |
| 4,546,047 | 10/1985 | Ryan | 428/565 |
| 4,563,329 | 1/1986 | Morishita et al. | 419/9 |
| 4,596,746 | 6/1986 | Morishita et al. | 428/458 |
| 4,624,860 | 11/1986 | Alber et al. | 427/46 |
| 4,726,101 | 2/1988 | Draghi et al. | 29/156.8 B |
| 4,830,934 | 5/1989 | Ferrigno et al. | 428/678 |

FOREIGN PATENT DOCUMENTS

| | | |
|---|---|---|
| 1017650 | 1/1966 | United Kingdom . |
| 2135698 | 9/1984 | United Kingdom . |
| 2240504 | 8/1991 | United Kingdom . |

*Primary Examiner*—Donald P. Walsh
*Assistant Examiner*—Chrisman D. Carroll
*Attorney, Agent, or Firm*—Wood, Herron & Evans

[57] ABSTRACT

A base metal repair tape includes a first layer formed from powdered base metal bonded together by fibrillated polytetrafluoroethylene and a second layer comprising a brazing alloy bonded together by fibrillated polytetrafluoroethylene. This is used to repair base metal by placing the first layer on the base metal and brazing the base metal so that the brazing alloy melts and diffuses into the base metal powder bonding it to the surface of the article. This permits the braze powder to be bonded to the base metal surface with minimal distance between the base powder particles.

8 Claims, No Drawings

METAL REPAIR TAPE FOR SUPERALLOYS

RELATED APPLICATIONS

This application is a continuation of application Ser. No. 08/018,866 filed Feb. 17, 1993, now abandoned, which is a continuation-in-part of application Ser. No. 07/970,692, filed Nov. 4, 1992, entitled "Metal Repair Tape," now abandoned.

BACKGROUND OF THE INVENTION

Metal parts, for example, those used in jet engines are frequently required to meet very precise tolerances. Damage to metal parts during use or during machining where a part is overmachined can prevent the part from falling within the set tolerances and require that the part be repaired or replaced. To repair such damage, new metal must be brazed to the surface of the part. This can either fill a crack or build up the surface of the part.

The new metal needs to have a composition similar to the base metal. Thus, braze fillers are combined with powder base metal to provide a composition which brazes to the base metal at a temperature lower than the melting point or softening point of the base metal. If the part is overheated, its structural and dimensional integrity can be jeopardized.

Typically, this has been done by forming a slurry which includes the powdered base metal, powdered diffusion braze alloy and a binder. Braze alloys generally include boron which acts as a melting point suppressant. These systems provide acceptable results. However, well defined geometries needed for some repairs are very difficult to obtain. In part, this is due to the high concentration (generally 50%) of diffusion braze alloy. This caused the repair metal to flow during processing. Generally, the maximum thickness of a repair is 0.015 inch.

Further, slurries such as these are difficult to use. The binder system must be initially mixed. Then the precise amount of base metal and diffusion braze filler must be combined. This has a very limited shelf life. It cannot be mass produced for sale and subsequent use. It must be prepared by the actual user which creates the potential problem of human error.

Also, the boron added to suppress the melting point attacks and weakens the base metal. Due to the high concentration of braze alloy (which contains boron) in these repair slurries, the braze alloy can melt and puddle at the surface of the base metal. This allows the boron to attack the surface metal and significantly weaken it. Because of this, a part usually can only be repaired with such a slurry 1–3 times. After that, the part had to be scrapped. If a part required a build up of more than 0.045 inch, this would require more than three repairs, and should not be feasible due to boron attack on the base metal exceeding allowable limits.

Also, with oxygen sensitive alloys such as those that include titanium, aluminum, hafnium, and chromium, heating above 800° F. can cause oxide formation. Most braze furnaces are designed to either operate in a vacuum or in a hydrogen atmosphere. However, there is frequently a trace amount of oxygen remaining in the furnace that can react with these metals. To avoid this problem, such alloys are nickel coated or fluoride ion cleaned prior to base metal repair. This nickel precoating is undesirable simply because it requires an extra step or even two extra steps frequently requiring masking of portions that are not to be nickel coated. Fluoride ion cleaning is undesirable as it requires additional processing steps including an expensive furnace operation.

SUMMARY OF THE INVENTION

Accordingly, it is an object of the present invention to provide a base metal repair which avoids the need for use of slurry coatings and which should not require nickel precoating or fluoride ion cleaning.

Further, it is an object of the present invention to provide such a base metal repair which provides precise dimensional repairs and permits a build up in excess of 0.015 inch at one time. Further, it is an object of the present invention to eliminate or reduce boron attack on the base metal during repair.

To achieve these objectives, the present invention is a base metal repair tape which includes two layers. The first or bottom layer is placed on the base metal surface with the second or outer layer facing away. The bottom layer is base metal powder bonded together by fibrillated polytetrafluoroethylene. The second or outer layer is a diffusion braze alloy also bonded together by fibrillated polytetrafluoroethylene. These two layers are laminated together and can be placed directly on the repair area as a tape. During the thermal repair cycle, the diffusion braze alloy melts and infiltrates the base metal tape providing a repair which maintains the dimensional integrity of the lower layer and provides a greater per volume density of basis metal.

This tape also cleans the repair surface as well as the base metal powder particles themselves. This is extremely important where the base metal contains high levels of aluminum and titanium which are potential oxide formers and potentially a threat to the success of the repair. Further, the tape's cleaning ability reduces or eliminates the need for nickel plating or possibly fluoride ion cleaning over the part in the repair area to enhance its brazability.

The resulting brazed structure is enhanced by the separation of the base metal powder and the diffusion metal powder. This separation reduces the spacing between the base metal powder particles. This provides a repair of more nearly part-like mechanical properties because of the higher base metal content per unit volume. Also, separation of the braze alloy from the surface of the part being repaired prevents the boron in the braze alloy from puddling on the surface and reduces boron attack on the part surface.

Further, the flexible and pliable nature of the tape allows repairs of complex geometries to be easily addressed and promotes the easy manufacture of preforms for repairing multiple identical parts. Finally, after the polytetrafluoroethylene resin has been evacuated, the base metal tape geometry structure remains intact providing for near drawing dimensioned preforms reducing timely and costly machining of the repair area.

These advantages of the present invention as well as others will be appreciated further in light of the following detailed description.

DETAILED DESCRIPTION

The present invention is a method of repairing base metal surfaces, particularly hard metal surfaces, using a diffusion brazing technique. Hard metal surfaces include, of course, all forms of steels and stainless steel, as well as nickel, cobalt, titanium, and tungsten based superalloys such as Rene 35, Rene 41, Rene 77, Rene 80, Rene 80H, Rene 95, Rene 125, Rene 142, Inconel 1606, Inconel 600, Inconel 625, Inconel 713, Inconel 718, Inconel 738, Hastelloy X, Wasp alloy, Haynes 188, L605, X-40, MarM-509, and MarM-247. These are repaired by positioning a composite material on the surfaces being repaired and heating the surface along with the composite up to a temperature which will effectively cause alloy in the composite to melt and bond to the surface.

The composite is a two layered tape structure. The first layer is a mixture of the base metal powder and a polytetrafluoroethylene binder. The second layer is a mixture of diffusion braze alloy and PTFE.

In both layers, a specific type of PTFE is required, specifically fibrillated PTFE. The fibrillated PTFE polymer used in the process of this invention is a high molecular weight PTFE resin produced by emulsion polymerization. These PTFE polymers have a broad molecular weight range of about 10–20 million and are commercially available products. Preparation of these polymers, which is described in U.S. Pat. No. 2,510,112, U.S. Pat. No. 2,587,357, and U.S. Pat. No. 2,685,707, involves well known emulsion polymerization techniques wherein tetrafluoroethylene under pressure and water containing an emulsifying agent is reacted with a water soluble free radical catalyst. The emulsion produced is coagulated, washed and then dried. The average particle size of the polymer is about 50–560 microns. Polymer having larger or smaller average particle size is operative.

The PTFE used to make the composition is commercially available from E.I. DuPont and Company, Wilmington, Del. sold under the trade designation Teflon®6C. Each layer will have from 0.25 to about 25% of the fibrillated PTFE and preferably 1 to about 15% by weight. The preferred composition includes 2% PTFE by weight.

The second component of the first layer is the powdered base metal itself which will make up the remainder of the composition. The powdered base metal is sized to from about 80 mesh or finer. Generally, smaller particle size is better for forming repairs. As previously indicated, the base metal is a hard metal such as stainless steel. This invention is most useful in repairing jet engine parts which are frequently formed from nickel based superalloys, formed from nickel, titanium, gold, aluminum, hafnium, palladium, cobalt, chromium, and the like. Thus, the first layer includes powdered metal which has the same composition as the part being repaired.

The second layer again is formed from two components, the fibrillated polytetrafluoroethylene and the diffusion braze alloy. A diffusion braze alloy is simply a braze alloy. There are many known braze alloys which can simply be purchased. The makeup of several of these compositions are listed below by weight:

| 1. Boron | 2.9 |
|---|---|
| Nickel | 92.6 |
| Tin | 4.5 |
| 2. Boron | 3.0 |
| Chromium | 7.0 |
| Iron | 3.0 |
| Nickel | 83.0 |
| Silicon | 4.0 |
| 3. Chromium | 19.0 |
| Nickel | 71.0 |
| Silicon | 10.0 |
| 4. Boron | 1.8 |
| Nickel | 94.7 |
| Silicon | 3.5 |
| 5. Boron | 0.8 |
| Cobalt | Balance |
| Chromium | 19.0 |
| Nickel | 17.0 |
| Silicon | 8.0 |
| Tungsten | 4.0 |
| 6. Boron | 2.75 |
| Chromium | 10.5 |
| Nickel | 50.3 |
| Palladium | 36.0 |
| Silicon | 0.5 |
| 7. Nickel | 58.0 |
| Chromium | 14.0 |
| Cobalt | 9.5 |
| Titanium | 4.9 |
| Water | 4.0 |
| Molybdenum | 4.0 |
| Aluminum | 3.0 |
| Boron | 2.1 |
| 8. Nickel | 55.0 |
| Chromium | 14.0 |
| Cobalt | 9.5 |
| Titanium | 4.9 |
| Water | 4.0 |
| Molybdenum | 4.0 |
| Aluminum | 3.0 |
| Silicon | 4.5 |
| Boron | 0.7 |
| 9. Nickel | 68.0 |
| Chromium | 15.0 |
| Titanium | 2.0 |
| Aluminum | 3.0 |
| Silicon | 8.0 |
| Boron | 4.0 |
| 10. Nickel | 62.5 |
| Chromium | 15.3 |
| Cobalt | 10.3 |
| Aluminum | 3.5 |
| Tantalum | 3.4 |
| Boron | 2.3 |

Such powder braze alloys can be purchased from companies such as Westgo, Praxair, and others.

To form the first layer, 1 to 6% (by weight) of the fibrillated PTFE (Teflon®6C) is combined with 94 to 99% of the powder base metal in a ball mill or other low shear mixer such as a KD miller with kinetic dispersion or a vibratory mixer.

In a ball mill, the mixture is milled at about 200 rpm using ⅜ inch stainless steel balls. This is continued until the mixture changes from a powder to small agglomerated particles generally 10 to 40 minutes (25 minutes normally). If this is continued too long, a thick viscous material like putty is obtained.

The mixture is then separated from the steel balls and rolled between adjustable rollers to a desired thickness. Specifically, the mixture is rolled between pressure rollers in a first direction. The formed sheet is folded and the folded sheet is rolled in a direction which is 90° from the axis of the first rolling step, i.e., cross rolled. Each rolling step decreases the thickness of the sheet. Preferably, the sheet is separated from the rollers by an aluminum foil separating sheet or other suitable material. This is continued until the desired thickness and consistency is obtained.

Likewise, the second layer is formed in the same manner as the first layer by combining 1 to 6% polytetrafluoroethylene with 99 to 94% diffusion braze alloy. This is then mixed in, for example, a ball mill separated from the steel shot and rolled to the desired dimension.

The ratio of braze alloy to base metal powder in the overall composite should be from about 95/5 to 5/95 by weight. If too much braze alloy powder is used, the metal tends to flow during processing. Thus, generally the ratio of braze powder to base metal will not exceed 40/60 and preferably is from 20/80 to 5/95. The desired ratio is achieved by varying the thickness of the two layers prior to lamination. This can also be accomplished by altering the concentrations of metal powder (either base metal or braze alloy) in the respective layers.

Generally, the first layer and the second layer are each formed to a thickness of about 0.002 to 0.24 and then are placed on top of each other and passed through the rollers to reduce their overall thickness by 50% which laminates them together. Thus, the final thickness of each layer will be ½ the originally rolled thickness of the individual layers, 0.001 to 0.12 each. This can then be cut to the desired size for use. The composite tape is preferably heated to 500° F. for 1 to 1.5 hours to provide stress relief.

To use the two layered composite, the damaged area of the base metal surface is covered with the repair tape formed to the desired size and shape with the base metal layer against the surface. The tape may be held to the base metal surface with an adhesive such as Nicrobraze 200 or using a two sided adhesive tape purchased from 3M. The thickness of the layers is established to provide the amount of base metal powder required. Generally, with a tape that is 98% base metal powder, the thickness of the first layer is 0.001 to 0.12 inches although this may change depending on the application.

The object is heated to a temperature of at least about 800° F. to 2300° F. which causes the PTFE to evaporate and the braze alloy to melt and infiltrate the base metal powder. For most nickel and cobalt alloys, at least 1750° F. is required. The braze alloy will then, upon cooling, bond the base metal powder particles to themselves as well as to the metal surface forming a homogeneous structure.

With alloys of titanium, aluminum, chromium, and hafnium, heating to a temperature above 800° F. causes oxide formation. With the present invention, the hydrogen fluoride generated as the polytetrafluoroethylene is heated removes the oxides of these metals allowing a good braze joint without prior nickel plating. This will be further appreciated in light of the following examples. Because microcrack cleaning was not required in this repair, the level of cleaning and reduced oxide formation from the structural tape itself is sufficient for an adequate repair.

EXAMPLE 1

A vane segment from a jet engine requires a base metal type repair on a flange surface which has been machined 0.050" under the drawing requirement for thickness. The alloys to be used in the repair are Inconel 718 and a diffusion alloy variant of Inconel 718 manufactured by Union Carbide, which includes the element boron as a melting point suppressant and as the diffusion promoter.

The repair operations follows:

1. A two layer tape (the manufacturing of which has been described previously), comprised of a "bottom" layer of 97% Inconel 718 plus 3% PTFE resin (by weight) and a "top" layer, comprised of 97% Inconel 718 plus boron and 3% PTFE resin is prepared. The thickness of the bottom layer is 0.060" and the top layer is 0.015" yielding a base metal to diffusion alloy ratio of 80% to 20%.

2. The tape is cut to match the surface to be repaired and placed against said surface using acryloid cement with the bottom tape layer in contact with the repair area.

3. The part is then processed in a vacuum furnace at a temperature of 2200°±25° F. for 120 minutes at 1 micron or better vacuum and cooled to room temperature.

4. The resultant 0.060" thick repair area allows for 0.010" machining to bring the surface back to drawing requirements.

EXAMPLE 2

A low pressure turbine vane segment made from Rene 77 requires a base metal repair on a flange which has been overmachined to 0.020" under tolerance. A tape is manufactured comprised of two layers. The first layer is 98% Rene 77 plus 2% PTFE resin and is 0.030" thick. The second layer is 98% a nickel based diffusion alloy plus 2% PTFE resin and is also 0.030" thick. This tape is cut to match the repair area and fixed in place with a suitable adhesive. The part is processed through a diffusion thermal treatment with the result being a repair which has a significantly higher degree of base metal properties than a simple braze repair. To achieve the required finished dimension, the repaired flange area is simply machined (e.g. milled, ground, etc.).

Note: Because microcrack cleaning was not required in this repair, the level of cleaning and reduced oxide formation from the structural tape itself is sufficient for an adequate repair.

In an alternate embodiment of the present invention, the base metal repair tape can be formulated from one layer where desired portions of the base metal powder and the diffusion braze alloy are combined together with about 2% fibrillated PTFE. This would be formed in the same manner as previously described except all of the components, i.e., the base metal, the braze alloy, and the PTFE would be combined in the ball mill and milled simultaneously. This is then rolled into a tape and used in the same manner as the two layer tape. This embodiment, however, is less preferred for "build-up" type repairs because the combination of the braze alloy with the base metal separates the base metal particles from themselves which provides for a repaired surface which is not as similar to the original base metal surface as would be obtained with the two layer structure. Also, this is more likely to permit boron attack on the surface of the part being repaired. However, this will function according to the present invention, and can be useful for crack and/or hole filling tape repairs.

As shown by the above description of the present invention, the advantages derived are significant providing cost savings and time savings and reducing the potential for human error. This, of course, has been a description of the present invention along with a description of the preferred method of practicing the invention currently known. However, the invention itself should be defined only by the appended claims wherein

We claim:

1. A base metal repair tape comprising powdered base metal and powdered braze alloy bonded together with fibrillated polytetrafluoroethylene;

wherein said powdered base metal is a superalloy selected from the group consisting of nickel, cobalt, titanium, aluminum, chromium and hafnium containing superalloys;

and wherein said tape comprises a first layer comprising said powdered base metal bonded together by fibrillated polytetrafluoroethylene and a second layer comprising powdered braze alloy bonded together by fibrillated polytetrafluoroethylene wherein said first layer and said second layer are laminated together.

2. The base metal repair tape claimed in claim 1 wherein the weight ratio of said braze alloy to said base metal powder is from 5:95 to 95:5 by weight.

3. The base metal repair tape claimed in claim 1 wherein said first layer comprises from about 0.5 to about 20% fibrillated polytetrafluoroethylene by weight, and said second layer contains from about 0.5 to about 20% fibrillated polytetrafluoroethylene by weight.

4. The repair tape claimed in claim 2 wherein said weight ratio is from 20:80 to 5:95.

5. A method of repairing a base metal surface comprising:

forming a preform to a desired shape and positioning said preform on said base metal, said preform having a first layer including said base metal powder bonded together in a cohesive layer by polytetrafluoroethylene and a second layer on said first layer, said second layer comprising a braze alloy bonded together in a uniform composite by polytetrafluoroethylene;

wherein said base metal is an oxygen-sensitive superalloy selected from the group consisting of titanium, aluminum, chromium and hafnium containing superalloys;

positioning said preform on a surface of said base metal with said first layer on said surface of said base metal without nickel plating said surface of said base metal; and brazing said first layer to said base metal surface at a temperature greater than 800° F.

6. The method claimed in claim 5 wherein said first layer has a thickness greater than 0.01 inch.

7. The method claimed in claim 6 wherein the weight ratio of said diffusion braze alloy to said base metal powder is from 20:80 to 5:95.

8. A base metal repair tape comprising powdered base metal and powdered braze alloy bonded together with fibrillated polytetrafluoroethylene wherein said tape comprises a first layer comprising powdered base metal bonded together by fibrillated polytetrafluorothylene and a second layer comprising powdered braze alloy bonded together by fibrillated polytetrafluorothylene wherein said first layer and said second layer are laminated together wherein said base metal is an oxygen-sensitive superalloy selected from the group consisting of titanium, aluminum, chromium and hafnium containing superalloy.

* * * * *